(12) United States Patent
Bradley

(10) Patent No.: US 11,230,942 B2
(45) Date of Patent: Jan. 25, 2022

(54) GAS TURBINE ENGINE ELECTRICAL GENERATOR

(71) Applicant: ROLLS-ROYCE plc, London (GB)

(72) Inventor: Jonathan P Bradley, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/915,032

(22) Filed: Jun. 29, 2020

(65) Prior Publication Data
US 2021/0010384 A1  Jan. 14, 2021

(30) Foreign Application Priority Data

Jul. 12, 2019 (GB) ...................................... 1910011

(51) Int. Cl.
| | | |
|---|---|---|
| *F01D 15/10* | (2006.01) | |
| *F01D 15/12* | (2006.01) | |
| *F02C 7/32* | (2006.01) | |
| *F02C 7/36* | (2006.01) | |

(52) U.S. Cl.
CPC ............. *F01D 15/10* (2013.01); *F01D 15/12* (2013.01); *F02C 7/32* (2013.01); *F02C 7/36* (2013.01); *F05D 2220/50* (2013.01); *F05D 2220/76* (2013.01); *F05D 2250/313* (2013.01)

(58) Field of Classification Search
CPC .. F01D 15/10; F01D 15/12; F02C 7/32; F02C 7/36; F05D 2220/50; F05D 2220/76; F05D 2250/313
See application file for complete search history.

(56) References Cited

U.S. PATENT DOCUMENTS

| | | |
|---|---|---|
| 4,531,357 A | 7/1985 | Weber et al. |
| 7,061,147 B2 | 6/2006 | Ries |
| 7,648,278 B2 | 1/2010 | Stout et al. |
| 7,692,347 B2 | 4/2010 | Nakajima |
| 10,309,454 B2 | 6/2019 | Takaoka |
| 10,495,144 B1 | 12/2019 | Ellwood, III et al. |
| 10,710,734 B2 | 7/2020 | Sankrithi |
| 10,724,400 B2 | 7/2020 | Ac et al. |
| 2004/0040312 A1 | 3/2004 | Hoffjann et al. |
| 2006/0137355 A1 | 6/2006 | Welch et al. |
| 2006/0138888 A1 | 6/2006 | Bouiller et al. |

(Continued)

FOREIGN PATENT DOCUMENTS

| | | |
|---|---|---|
| DE | 10 2010 049 885 A1 | 5/2012 |
| DE | 102013209388 A1 | 11/2014 |

(Continued)

OTHER PUBLICATIONS

Search Report of the Intellectual Property Office of the United Kingdom for GB1910010.6 with search date of Jan. 9, 2020.

(Continued)

*Primary Examiner* — Audrey B. Walter
(74) *Attorney, Agent, or Firm* — Oliff PLC

(57) ABSTRACT

An aircraft gas turbine engine (10) comprises a main engine shaft (22) arranged to couple a turbine (17) and a compressor (13), the main engine shaft (22) defining an axial direction (9). The gas turbine engine (10) further comprises at least one radially extending offtake shaft (27) coupled to the main engine shaft (22), and a radially extending electric machine (25*a*, 25*b*) coupled to the radially extending offtake shaft (22).

13 Claims, 7 Drawing Sheets

(56) References Cited

U.S. PATENT DOCUMENTS

| | | |
|---|---|---|
| 2008/0001038 A1 | 1/2008 | Daggett |
| 2008/0110151 A1* | 5/2008 | Welch ................. F02C 7/262 |
| | | 60/39.091 |
| 2008/0148881 A1 | 6/2008 | Moniz et al. |
| 2008/0166076 A1 | 7/2008 | Stout et al. |
| 2010/0000226 A1* | 1/2010 | Rensch ................. F02C 7/32 |
| | | 60/784 |
| 2010/0327588 A1 | 12/2010 | Macchia |
| 2011/0154827 A1 | 6/2011 | Ress, Jr. et al. |
| 2013/0098179 A1* | 4/2013 | Beier .................. F02C 7/36 |
| | | 74/15.63 |
| 2014/0026700 A1* | 1/2014 | Beier .................. H02K 5/20 |
| | | 74/405 |
| 2014/0306460 A1 | 10/2014 | Donnelly |
| 2015/0308383 A1 | 10/2015 | Hoffjann et al. |
| 2015/0311770 A1 | 10/2015 | Goi et al. |
| 2016/0160867 A1 | 6/2016 | Gehlot |
| 2017/0141648 A1* | 5/2017 | Chong ................ H02K 7/1823 |
| 2018/0051701 A1 | 2/2018 | Kupiszewski et al. |
| 2018/0138767 A1 | 5/2018 | Moore et al. |
| 2018/0372004 A1 | 12/2018 | Alstad et al. |
| 2019/0048826 A1* | 2/2019 | Pointon ................. F02C 3/107 |
| 2019/0101057 A1 | 4/2019 | Stevenson et al. |
| 2019/0178104 A1 | 6/2019 | Joshi et al. |
| 2019/0218978 A1 | 7/2019 | Edwards et al. |
| 2019/0316486 A1 | 10/2019 | Roberge |

FOREIGN PATENT DOCUMENTS

| | | |
|---|---|---|
| EP | 1939429 A2 | 7/2008 |
| EP | 3511549 A1 | 7/2019 |
| GB | 2 443 743 A | 5/2008 |
| GB | 2 550 397 A | 11/2017 |
| RU | 2168024 02 | 5/2001 |

OTHER PUBLICATIONS

Search Report of the Intellectual Property Office of the United Kingdom for GB1910011.4 with search date of Dec. 17, 2019.
Search Report of the Intellectual Property Office of the United Kingdom for GB1910008.0 with search date of Jan. 9, 2020.
Search Report of the Intellectual Property Office of the United Kingdom for GB1910009.8 with search date of Jan. 9, 2020.
Dec. 8, 2020 Extended Search Report issued in European Patent Application No. 20180138.8.
Dec. 8, 2020 Extended Search Report issued in European Patent Application No. 20180140.4.
Dec. 8, 2020 Extended Search Report issued in European Patent Application No. 20180139.6.
Dec. 8, 2020 Extended Search Report issued in European Patent Application No. 20180137.0.
U.S. Appl. No. 16/914,867, filed Jun. 29, 2020 in the name of Paul R. Davies.
U.S. Appl. No. 16/914,827, filed Jun. 29, 2020 in the name of Paul R. Davies.
U.S. Appl. No. 16/914,911, filed Jun. 29, 2020 in the name of Jonathan P. Bradley.
Aug. 18, 2021 Office Action issued in U.S. Appl. No. 16/914,827.
Nov. 10, 2021 Notice of Allowance issued in U.S. Appl. No. 16/914,911.
Nov. 12, 2021 Notice of Allowance issued in U.S. Appl. No. 16/914,827.

* cited by examiner

GAS TURBINE ENGINE ELECTRICAL GENERATOR

CROSS-REFERENCE TO RELATED APPLICATIONS

This application claims the benefit of United Kingdom Patent Application No. 1910011.4 filed Jul. 12, 2019, the disclosure of which is herein incorporated by reference in its entirety.

TECHNICAL FIELD

The present disclosure relates to electric machines of gas turbine engines, and gas turbines comprising electrical machines.

BACKGROUND

Aircraft gas turbine engines provide both propulsive and electric power for aircraft. Consequently, such engines comprise electric machines such as generators for providing electric power. Further electric machines in the form of motors configured to drive fluid pumps such as oil and fuel pumps may also be provided.

As electrical power demands increase, and electrical motors are increasingly used to replace hydraulic and pneumatic motors in aircraft, the size of electric machines on aircraft is steadily increasing relative to the size of the gas turbine engines. Consequently, packaging of such machines within the limited space available is becoming increasingly difficult.

A conventional packaging arrangement for an electric machine for a gas turbine engine is shown in FIG. 1. A gas turbine engine 1 comprises a main engine compressor shaft 2, which rotates when the engine 1 is in operation. The main engine shaft 2 is coupled to an offtake shaft 3 via a first set of bevel gears 4. The offtake shaft 3 is in turn coupled to an angle drive shaft 5 through a second set of bevel gears 6. An electric machine 7 is coupled to the angle drive shaft 5. Such an arrangement is heavy, complex, and inefficient, in view of the gearing.

Alternative arrangements have also been proposed, including so-called "embedded generators" such as that shown in FIG. 2. In an embedded arrangement, an electric machine 7A is installed within an annular space radially inward of a compressor 8A of a gas turbine engine 1A, and is driven directly by a main engine shaft 2A. Such an arrangement provides for efficient packaging, but provides difficulty for access for maintenance, and requires that the electric machine be operated in a hot environment.

The present invention seeks to provide an improved packaging arrangement.

SUMMARY

According to a first aspect there is provided an aircraft gas turbine engine comprising: a main engine shaft arranged to couple a turbine and a compressor, the main engine shaft defining an axial direction; at least one radially extending offtake shaft coupled to the main engine shaft; and a radially extending electric machine coupled to the radially extending offtake shaft.

The inventors have found that, by re-orienting the electric machine to a radial orientation, and coupling the electric machine to the offtake shaft, an arrangement can be provided which is at least one of lighter, more compact, and more efficient.

The electric machine may be directly coupled to the radially extending offtake shaft. advantageously, such an arrangement is compact and efficient, in view of the reduced gearing.

Alternatively, the electric machine may be coupled to the radially extending offtake shaft by a reduction gearbox. Advantageously, a high speed offtake shaft can be used, which can transfer high power at relatively low torque. The other hand, the electric machine can rotate relatively slowly, which can allow for a large radius electric machine to be used, which may have a high power density.

The electric machine may comprise an electric motor configured to provide motive power to start the gas turbine engine in a starting mode, and may comprise a generator configured to generate electrical power when in a running mode.

The electric machine may comprise an axial flux electric machine in which a stator of the electric machine is axially offset relative to a rotor of the electric machine. Consequently, the electric machine can have a smaller axial depth for a given power, which greatly increases packaging efficiency of the arrangement. Alternatively, the electric machine may comprise a radial flux electric machine, in which a stator of the electric machine is radially inward or radially outward of a rotor of the electric machine.

The gas turbine engine may comprise a plurality of radially extending offtake shafts circumferentially arrayed around the main engine shaft. Each radially extending offtake shaft may be coupled to a respective radially extending electric machine. Consequently, instead of a single electric machine, several are provided, distributed about the circumference of the engine. This provides several advantages, including further increased packaging, as well as increased redundancy, since an electric machine can continue to operate in the event of a failure of either an offtake drive shaft or an electric machine.

The gas turbine engine may comprise a low pressure compressor or a fan coupled to a low pressure turbine by a low pressure shaft, and the offtake shaft may be coupled to the low pressure shaft. The gas turbine engine may comprise a high pressure compressor coupled to a high pressure turbine by a high pressure shaft, and the offtake shaft may be coupled to the high pressure shaft. The low and high pressure shafts may be coaxial, and the low pressure shaft may be provided radially inward of the high pressure shaft along at least part of its length.

The low pressure compressor may be located axially forwardly of the high pressure compressor.

The gas turbine engine may comprise a fan coupled to main engine shaft.

One or more offtake shaft may be coupled to the main engine shaft at an axial space between the high and low pressure compressors. Typically, at least in some engine designs, the engine narrows at this point before widening again, meaning that the generators can be provided within this region, such that the engine as a whole is approximately cylindrical. Consequently, greatly improved packaging is provided.

The electric machine may comprise a permanent magnet electric machine. Permanent magnet machines have a high power density, and so enable still further reductions in weight, and increased packaging efficiency.

Arrangements of the present disclosure may be particularly, although not exclusively, beneficial for fans that are driven via a gearbox. Accordingly, the gas turbine engine may comprise a fan speed reduction gearbox that receives an input from one or more main engine shaft and outputs drive to the fan so as to drive the fan at a lower rotational speed than the main engine shaft. The input to the gearbox may be directly from the main engine shaft, or indirectly from the main engine shaft, for example via a spur shaft and/or gear. The main engine shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 3:
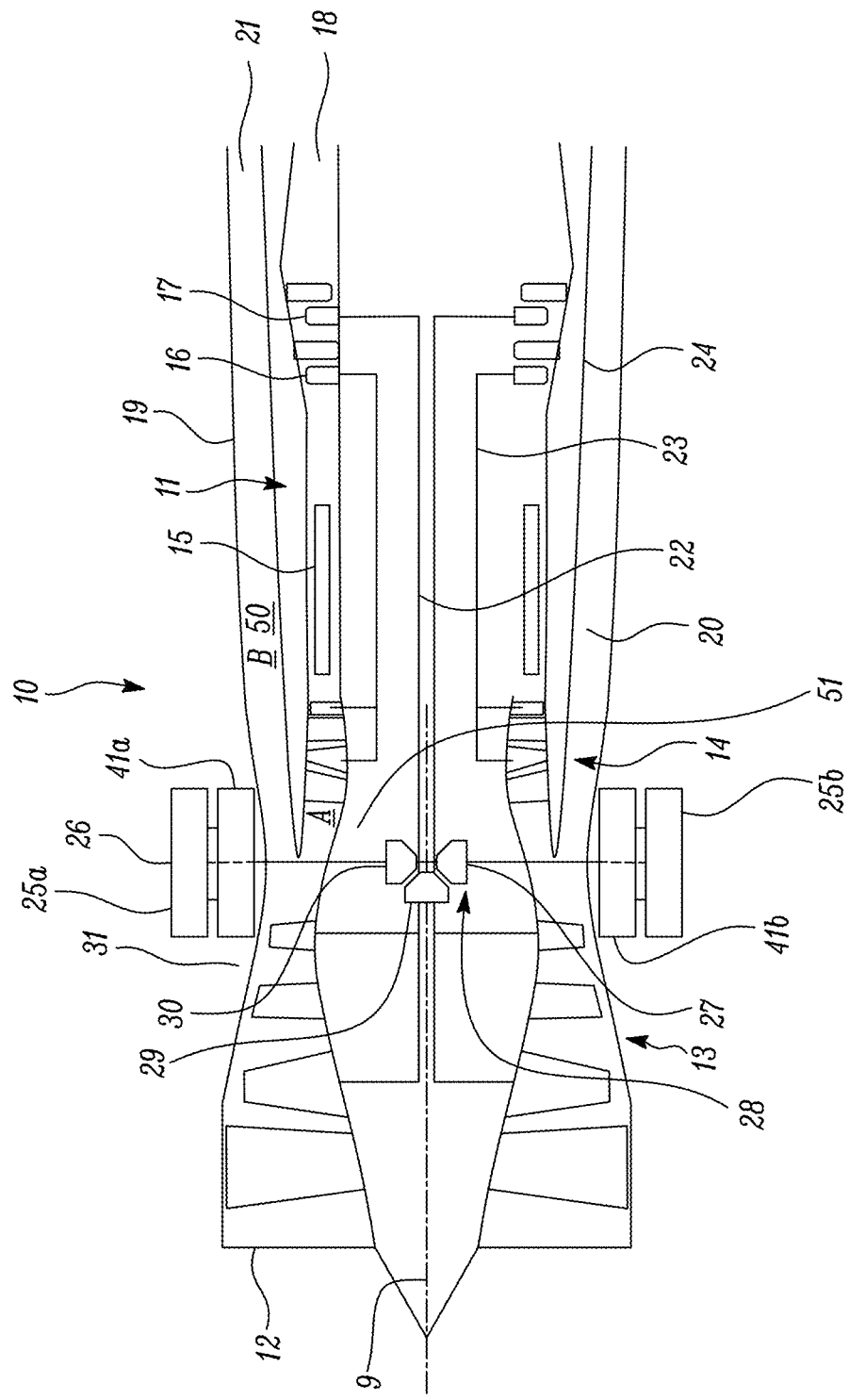
FIG. 3 is a sectional side view of a first gas turbine engine in accordance with the present disclosure.

FIG. 3 illustrates a gas turbine engine 10 having a principal rotational axis 9. The engine 10 comprises an air intake 12 and a propulsive fan 13 that generates two airflows: a core airflow A and a bypass airflow B. The gas turbine engine 10 comprises a core 11 that receives the core airflow A. The engine core 11 comprises, in axial flow series, a compressor 14, combustion equipment 15, a high-pressure turbine 16, a low pressure turbine 17 and a core exhaust nozzle 18. A nacelle 19 surrounds the gas turbine engine 10 and defines a bypass duct 20 and a bypass exhaust nozzle 21.

The bypass airflow B flows through the bypass duct 50, which is bounded by a radially inner wall in the form of a core nacelle 24. The fan 13 is attached to and driven by the low pressure turbine 17 via a low pressure shaft 22. The compressor 14 is coupled to the high pressure turbine 16 by a high pressure shaft 23. The high and low pressure shafts 22, 23 comprise main engine shafts, also known as core engine shafts, since they transfer torque directly from the main engine turbines 16, 17 to other components of the engine 10.

In use, the core airflow A is accelerated and compressed by the compressor 14 and directed into the combustion equipment 15 where it is mixed with fuel and the mixture is combusted. The resultant hot combustion products then expand through, and thereby drive, the high pressure and low pressure turbines 16, 17 before being exhausted through the nozzle 18 to provide some propulsive thrust. The high pressure turbine 16 drives the compressor 14 by a high pressure shaft 23. The fan 13 is in the form of a high pressure, low bypass ratio, multi-stage fan. In view of the high pressure ratio of the fan 13, the fan 13 can be regarded as a further compressor.

Figure 4:
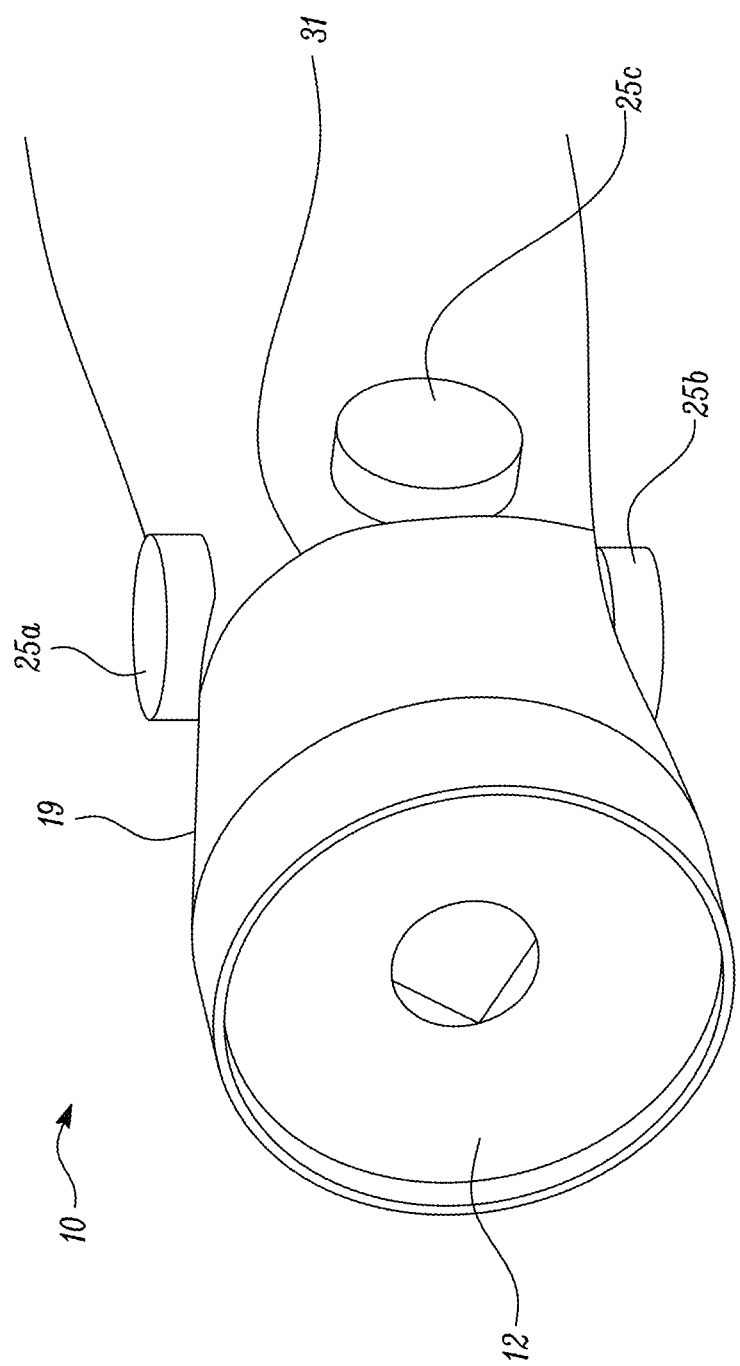
FIG. 4 is an isometric view from the front and one side of the gas turbine engine of FIG. 3.

The gas turbine engine comprises an electric machine arrangement, which is configured to produce electrical power, and/or provide motive power to start the engine. The electric machine arrangement comprises at least one, and in this case four electric machines 25a-d, (two of which are shown in FIG. 3, a third is shown in FIG. 4, and the fourth 25d is not shown, but is on the opposite side to the third electric machine 25c), which are arrayed around the fan nacelle 19.

Each electric machine is provided at a location generally between the fan 13 and compressor 14. In this location, the nacelle 19 outer line contracts inwardly, before expanding outwardly axially downstream. Consequently, a space 31 is provided, in which an electric machine can be provided. If an electric machine can be provided wholly within this space, the overall width of the engine 10 can be reduced to be substantially the same as the bypass duct, which will then represent the largest part. Consequently, an aircraft having such a small engine installation can be made to be more aerodynamic, and therefore faster, more fuel efficient, or longer ranged. However, this space is relatively small, and so it is highly challenging to provide an installation arrangement in which electric machines are wholly or at least largely confined to this space.

Each electric machine defines an axis 26. As can be seen from FIG. 3, the axis of each electric machine 25a-d is generally radial relative to the engine longitudinal axis 9, i.e. the axis 26 of each electric machine 25a, 25b is generally normal to the engine longitudinal axis 9. This is enabled by mounting the respective electric machines without an intermediate bevel gearbox to an offtake shaft in the form of a radial drive shaft 27, i.e. without changing the rotational axis to be parallel with the main engine shafts 22, 23.

Each radial drive shaft 27 is coupled to the low pressure shaft 22 via a bevel gear arrangement 28. The bevel gear arrangement 28 is located in an axial space 51 provided between the low and high pressure compressors 13, 14, and comprises a first bevel gear 29, which rotates with the low pressure shaft 22, and meshes with second and third 30, 31 bevel gears, which rotate about the axis of the radial drive shaft 27. Fourth and fifth bevel gears (not shown) are provided for the third and fourth electric machines.

Consequently, the radial drive shaft 27 is driven by the low pressure shaft 22 via the bevel gear arrangement 28 where the electric machines 25a, 25b are operated as an electrical generator, and the low pressure shaft 22 is driven by the electric machines 25a, 25b when the electric machines 25a, 25b are operated as starter motors.

The electric machines 25a, 25b may not be driven directly by the radial drive shaft 27, and in this embodiment are instead coupled by an intermediate reduction gearbox 41a, 41b, which is provided at a radially outward end of each radial drive shaft 27 adjacent a respective electric machine 25a, 25b.

FIG. 4 shows an isometric view of the front part of the gas turbine engine 10. As can be seen, in view of the radial axis of the electric machines 25a, 25b, 25c and the relatively small sizes of the electric machines, the electric machine arrangement can be fitted within the space 31, such that the overall diameter of the engine 10 is reduced. The overall power of the electric machines 25a-d is nonetheless relatively high, in part due to the multiplicity of machines enabled by the multiple radial drive shafts 27. This multiplicity of electric machines also provides redundancy, such that, in the event of a failure of one electrical machine or radial drive 27, another electric machine can continue to operate. Additional increased power density and improved packaging is provided in view of the architecture of the electric machines 25a-d themselves.

Figure 5A:
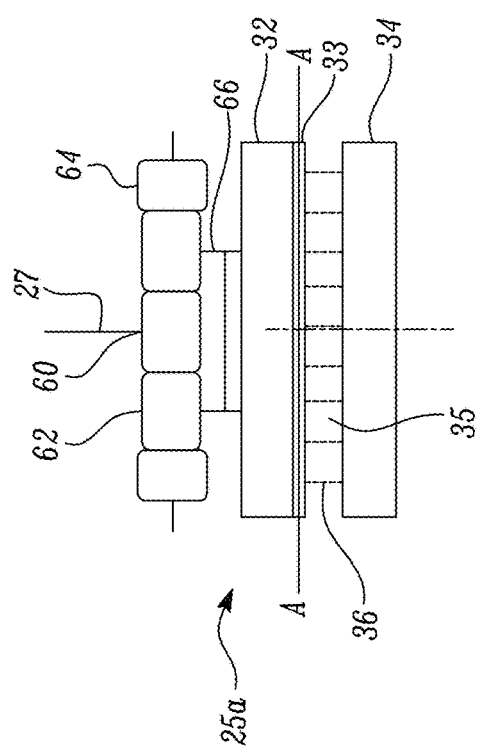
FIG. 5a is a sectional side view of an electric machine of the gas turbine engine of FIG. 3.

FIG. 5 shows a first electric machine 25a for the gas turbine engine 10. Each machine 25 is in the form of a permanent magnet, axial flux electric machine. The machine comprises a machine rotor 32, which is coupled to the radial drive shaft 27 via the reduction gearbox 41a. As can be seen, the reduction gearbox is in the form of an epicyclic gearbox, comprising a sun input gear 60 of the gearbox 41a. The sun gear 60 meshes with a plurality of planet gears 62, which in turn mesh with a ring gear 64. The ring gear is held static, while the planet gears are mounted to a planet carrier 66, which is allowed to rotate and is in turn mounted to the machine rotor 32 to thereby turn the machine rotor 32 at a reduced speed relative to the radial drive shaft 27.

Figure 5B:
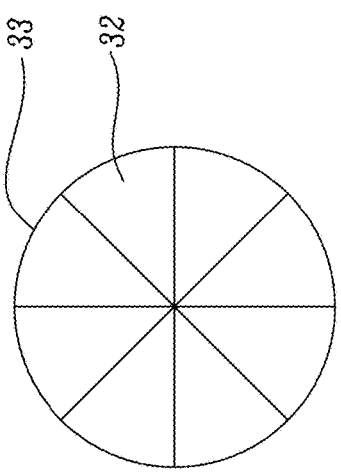
FIG. 5b is a sectional side view of the electric machine of FIG. 4a through the line A-A.

The rotor 32 of the electric machine 25a comprises a plurality of permanent magnets 33, which are attached to an axial surface of the rotor, and are arranged as shown in FIG. 5b. The permanent magnets face a stator 34 across an airgap 35. Each stator comprises a plurality of electric windings (not shown), which can be energised with electrical current to enable the machine to act as a motor, or will be energised by interaction with the rotating magnetic field of the rotor 33 to act as a generator.

As can be seen, magnetic flux from the permanent magnets 33 and stator windings emanate in an axial direction, i.e. parallel to the axis of rotation 26 of the electric machine 25a. Consequently, the electric machine 25a can be described as an axial flux electric machine. Such machines can have a high power density, and a short axial length, since the power is related to the diameter of the machine, rather than the axial length. Consequently, a high power electric machine can be provided with a radial principal axis 27, whilst maintaining a small overall diameter of the gas turbine engine 10 as a whole. It has been found that incorporating a reduction gearbox between the radial drive shaft and the machine rotor 32 is particularly advantageous for an axial flux machine, since axial flux machines tend to have relatively large diameter rotors, and so this arrangement results in lower rotor tip speeds, and so lower stresses on the rotor 32.

Figure 6A:
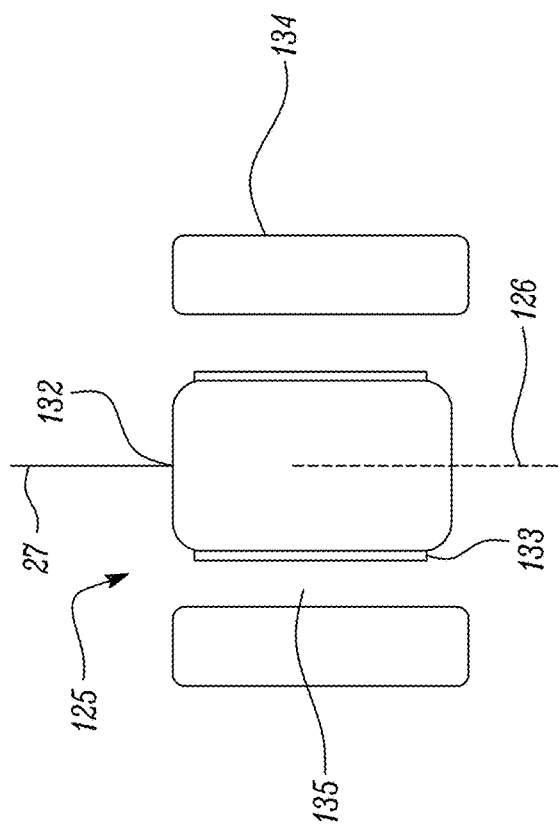
FIG. 6 is a sectional side view of an alternative electric machine for the gas turbine engine of FIG. 3.
Figure 6B:
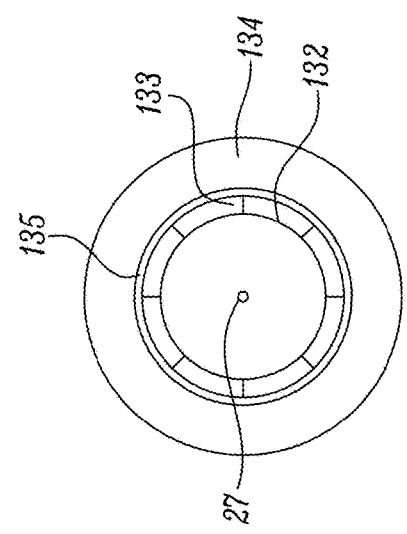

FIGS. 6a and 6b show an alternative electric machine 125, which can be used in place of the electric machine 25a-d. The machine 125 is in the form of a permanent magnet, radial flux electric machine. The machine comprises a machine rotor 132, which is directly coupled to the radial drive shaft 27. The rotor 132 comprises a plurality of permanent magnets 133, which are attached to an annularly outer surface of the rotor, and are arranged as shown in FIG. 6b. The permanent magnets 133 face a stator 134 across an airgap 135. Each stator 135 comprises a plurality of electric windings (not shown), which can be energised with electrical current to enable the machine to act as a motor, or will be energised by interaction with the rotating magnetic field of the rotor 133 to act as a generator.

As can be seen, magnetic flux from the permanent magnets 133 and stator windings emanate in a radial direction, i.e. normal to an axis of rotation 126 of the electric machine 125. Consequently, the electric machine 125 can be described as a radial flux electric machine. Such machines can have a high power density, and a relatively long axial length compared to an equivalent axial flux machine, since the power is related to the axial length of the machine, rather than the diameter.

Figure 7:
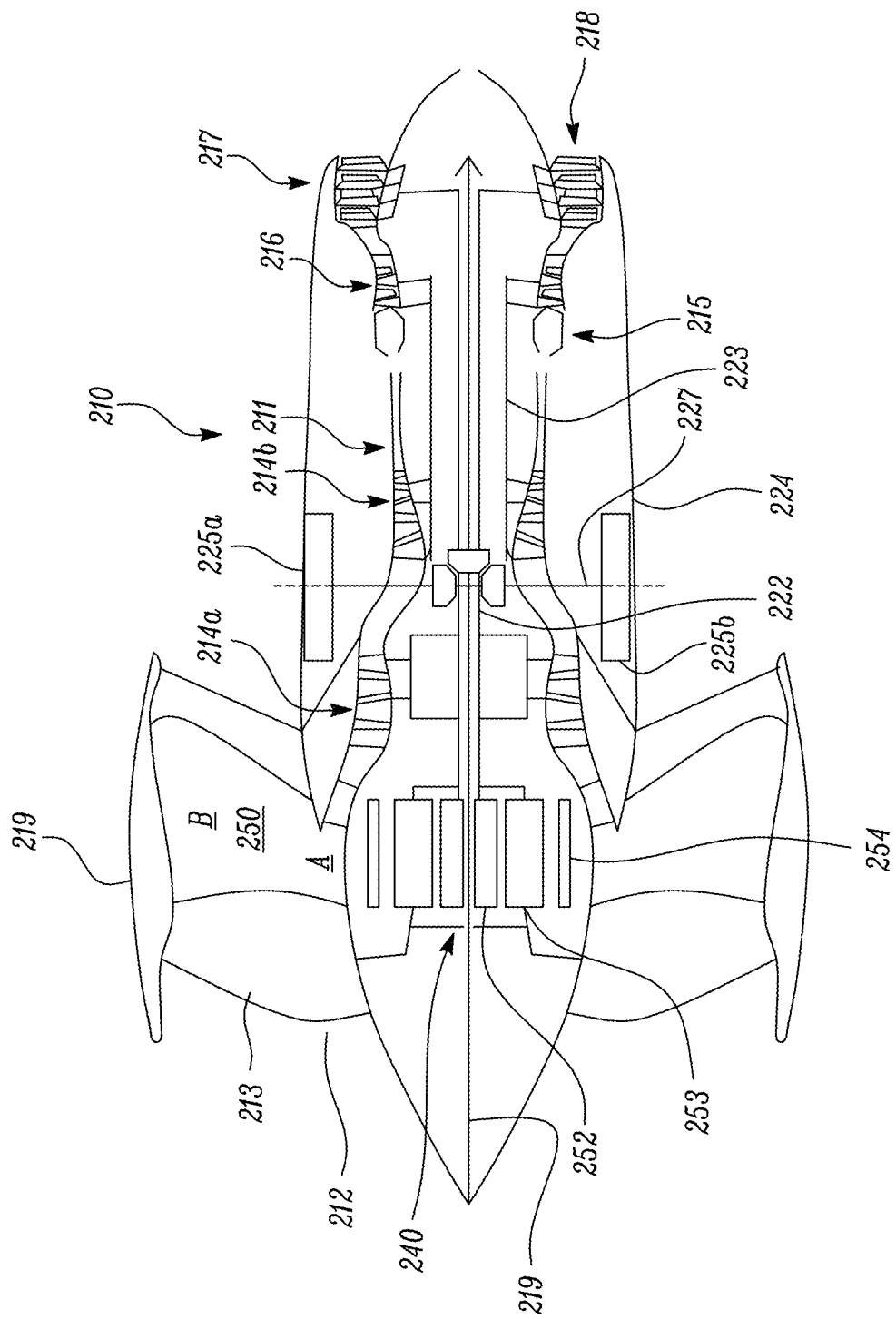
FIG. 7 is a sectional side view of a second gas turbine engine in accordance with the present disclosure.

FIG. 7 shows an alternative gas turbine engine 210 in the form of a geared, high bypass ratio gas turbine engine 210. The engine 210 comprises an air intake 212 and a propulsive fan 213 that generates two airflows: a core airflow A and a bypass airflow B. the fan 213 differs from the fan 13, in that only a single, low pressure stage is provided. However the fan has a much larger diameter compared to the core 211, and so defines a high bypass ratio. The gas turbine engine 210 comprises a core 211 that receives the core airflow A. The engine core 211 comprises, in axial flow series, a low pressure compressor 214a, a high pressure compressor 214b, combustion equipment 215, a high-pressure turbine 216, a low pressure turbine 217 and a core exhaust nozzle 218. A nacelle 219 surrounds the gas turbine engine 210 and defines a bypass duct 250. The bypass airflow B flows through the bypass duct 250, which is bounded by a radially inner wall in the form of a core nacelle 224. The fan 213 is attached to and driven by the low pressure turbine 217 via a low pressure shaft 222 and reduction gearbox 240. The low pressure turbine also drives the low pressure compressor 214a. The high pressure compressor 214b is coupled to the high pressure turbine 216 by a high pressure shaft 223. The shafts 222, 223 rotate about a longitudinal axis 219.

The low pressure turbine 217 drives the low pressure shaft 222, which is coupled to a sun wheel, a sun gear 252 of the gearbox 240. The sun gear meshes with a plurality of planet gears 253, which in turn mesh with a statically held ring gear 254. The planet gears are mounted to a planet carrier, which is in turn mounted to the fan 213 to thereby turn the fan at a reduced speed compared to the low pressure turbine 217.

The gas turbine engine 210 additionally comprises an electric machine arrangement, which is configured to produce electrical power, and/or provide motive power to start the engine. The electric machine arrangement is similar to the arrangement of the first embodiment, and again comprises at least one, and in this case four electric machines 225a-d, (two of which are shown in FIG. 7), which are arrayed within the core nacelle 224, radially outward of the core gas flow path defined by the compressors 214a, 214b. The electric machines 225a-d are again directly coupled to respective radial drive shafts 227, which are in turn driven by the low pressure shaft 222 via a bevel gear arrangement. Again therefore, the electric machines can be provided within the diameter of the gas turbine engine core, without increasing the diameter of the core, thereby providing a lightweight, efficient, dense package, with high levels of redundancy.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 7 has a split flow nozzle meaning that the flow through the bypass duct has its own nozzle that is separate to and radially outside the core engine nozzle 20. However, this is not limiting, and any aspect of the present disclosure may also apply to engines in which the flow through the bypass duct and the flow through the core are mixed, or combined, before (or upstream of) a single nozzle, which may be referred to as a mixed flow nozzle. One or both nozzles (whether mixed or split flow) may have a fixed or variable area.

Whilst the described example relates to a turbofan engine, the disclosure may apply, for example, to any type of gas turbine engine, such as an open rotor (in which the fan stage is not surrounded by a nacelle) or turboprop engine, for example.

Figure 1:
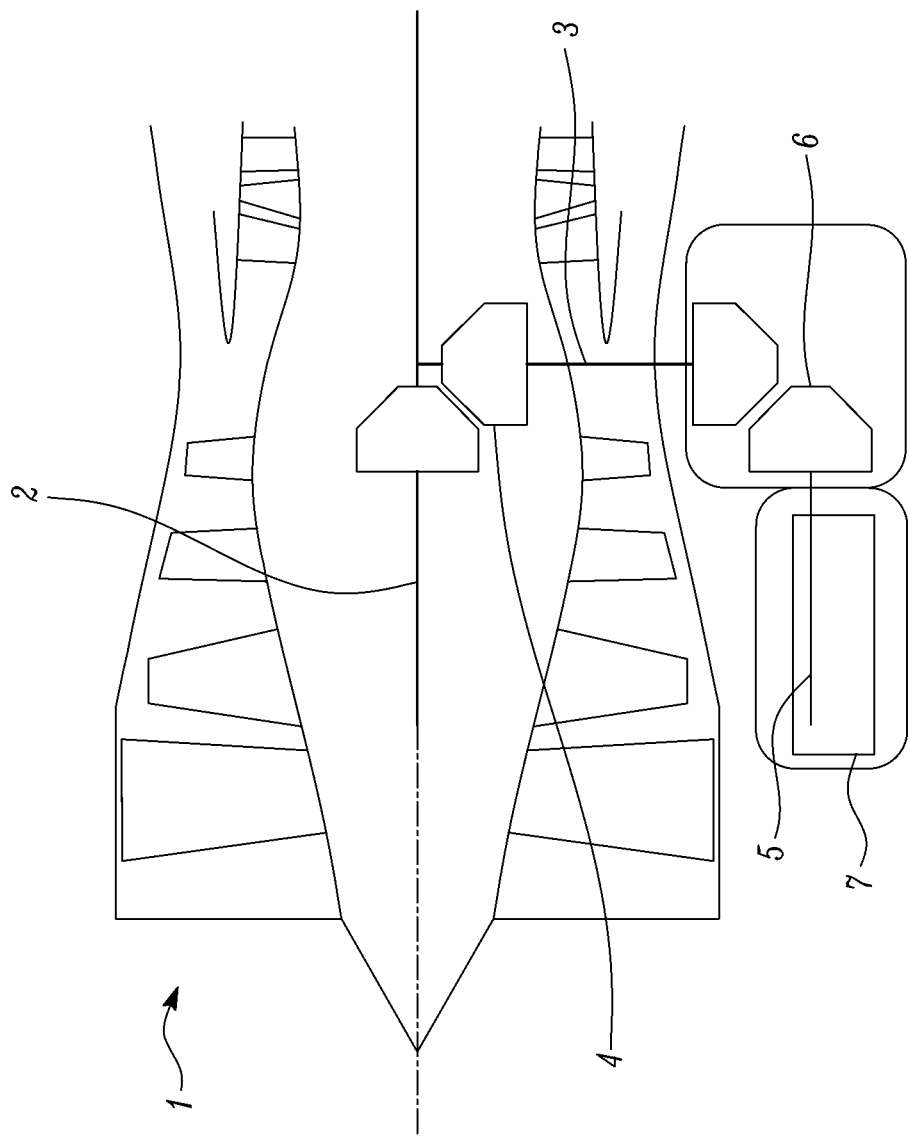
FIG. 1 is a sectional side view of a first prior gas turbine engine.
Figure 2:
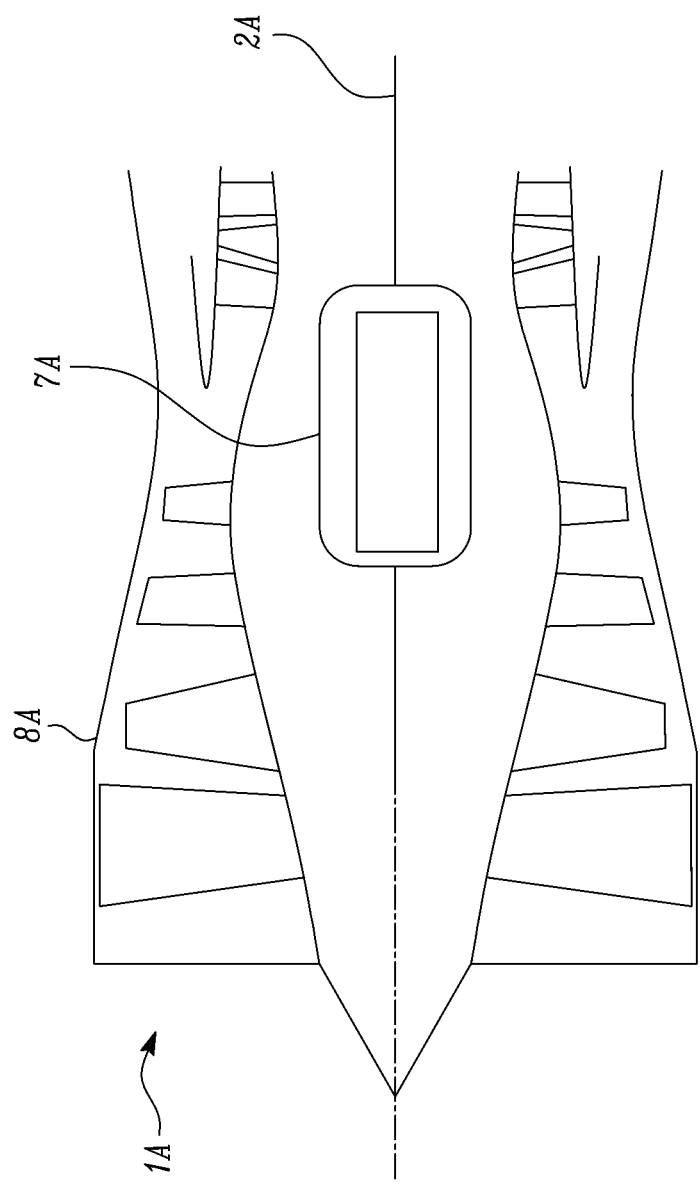
FIG. 2 is a sectional side view of a second prior gas turbine engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Different types of electric machines could be used. For example, hybrid axial/radial flux machines could be used. The permanent magnet machines could be replaced with induction machines. The machines could be coupled to the high pressure shaft, or could be coupled to the low pressure shaft after the gearbox (i.e. at the output side of the gearbox, where the speed is reduced). The machines could be physically located within the bypass nacelle, or radially inward of the bypass and/or core gas flow paths.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the radial offtake shafts need not extend wholly radially, i.e. they need not be entirely normal to the engine longitudinal direction, provided the offtake shafts extend radially to some extent, i.e. are not parallel to the engine longitudinal direction. For instance, the offtake shafts may be angled somewhat toward an axially forward or rearward direction, in order to provide for improved packaging.

The electric machines may be mounted in different locations, and may be coupled to different shafts. For instance, the electric machines may be coupled to the high pressure shaft. In a gas turbine engine comprising three separate spools, the electric machines may be coupled to any of a low pressure, intermediate pressure or high pressure shaft.

The electric machines could be of different types. For instance, one or more machine could comprise an induction machine. The electric machines could be provided in different locations, such as within the engine core, radially inward of a core gas flow path, or could be located within an engine bypass nacelle.

The invention claimed is:

1. An aircraft gas turbine engine comprising:
    a main engine shaft arranged to couple a turbine and a compressor, the main engine shaft defining an axial direction;
    at least one radially extending offtake shaft coupled to the main engine shaft; and
    a radially extending electric machine coupled to the radially extending offtake shaft,
    wherein the electric machine comprises an axial flux electric machine in which a stator of the electric machine is axially offset relative to a rotor of the electric machine, and
    wherein a nacelle is provided surrounding the gas turbine engine, and
    wherein the nacelle comprises a space where an outer surface contracts inwardly before expanding outwardly downstream, the electric machine being provided at the space.

2. A gas turbine engine according to claim 1, wherein the electric machine is directly coupled to the radially extending offtake shaft.

3. A gas turbine engine according to claim 1, wherein the electric machine is coupled to the radially extending offtake shaft by a reduction gearbox.

4. A gas turbine engine according to claim 1, wherein the electric machine comprises at least one of an electric motor configured to provide motive power to start the gas turbine engine in a starting mode, and a generator configured to generate electrical power when in a running mode.

5. A gas turbine engine according to claim 1, wherein the electric machine comprises a permanent magnet electric machine.

6. A gas turbine engine according to claim 1, wherein the gas turbine engine comprises a fan speed reduction gearbox that receives an input from the main engine shaft and outputs drive to a fan so as to drive the fan at a lower rotational speed than the main engine shaft.

7. A gas turbine engine according to claim 1, wherein the rotor of the electric machine includes a plurality of magnets disposed along a first side of the rotor, the plurality of magnets oriented so as to face the stator of the electric machine across an air gap, and wherein a second side of the rotor opposite to the first side includes a planet carrier directly mounted to the rotor.

8. A gas turbine engine according to claim 1, wherein the at least one radially extending offtake shaft includes a plurality of radially extending offtake shafts circumferentially arrayed around the main engine shaft.

9. A gas turbine engine according to claim 8, wherein the radially extending electric machine comprises a plurality of radially extending electric machines, wherein each radially extending offtake shaft is directly coupled to a respective one of the plurality of radially extending electric machines.

10. A gas turbine engine according to claim 1, further comprising a low pressure compressor or a fan coupled to a low pressure turbine by a low pressure shaft, the compressor comprising the low pressure compressor or the fan, the turbine comprising the low pressure turbine, the main engine shaft comprising the low pressure shaft.

11. A gas turbine engine according to claim 10, wherein the gas turbine engine further comprises a high pressure compressor coupled to a high pressure turbine by a high pressure shaft.

12. A gas turbine engine according to claim 11, wherein one or more offtake shaft is coupled to one of the low pressure shaft and the high pressure shaft.

13. A gas turbine engine according to claim 12, wherein the one or more offtake shaft is coupled to the main engine shaft at an axial space between the high and low pressure compressors.

* * * * *